(No Model.)

A. M. DE GRAY.
WHEELBARROW FRAME.

No. 306,813. Patented Oct. 21, 1884.

WITNESSES:
Ernest Abshagen
Geo. L. Wheelock

INVENTOR
Abram M. De Gray
BY Knight Bros
*His* ATTORNEYS

United States Patent Office.

ABRAM M. DE GRAY, OF JERSEY CITY, NEW JERSEY.

WHEELBARROW-FRAME.

SPECIFICATION forming part of Letters Patent No. 306,813, dated October 21, 1884.

Application filed April 24, 1884. (No model.)

*To all whom it may concern:*

Be it known that I, ABRAM M. DE GRAY, a citizen of the United States, and a resident of Jersey City, New Jersey, have invented certain new and useful Improvements in Wheelbarrows, of which the following is a specification.

My invention relates to the frames of wheelbarrows, said frames being constructed of one continuous bar or strip of metal, and so shaped that the outer ends or terminals of the bar will be adapted to form handles for the wheelbarrow, while intermediate between these ends, and on the same bar, I place the box or casing of the vehicle, supporting the rear of said box by upwardly-curved portions.

My invention relates also to certain details of construction hereinafter described, and specifically pointed out in the claims.

Figure 1:
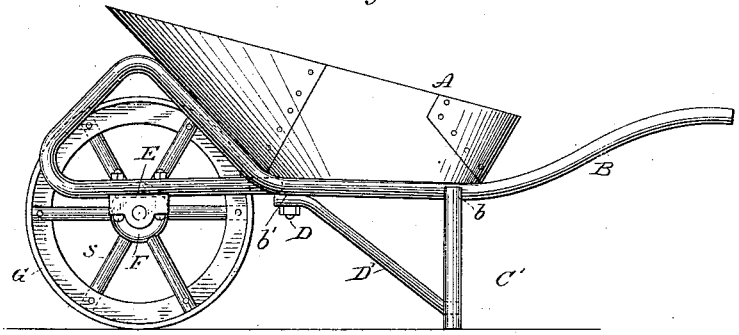
Figure 2:
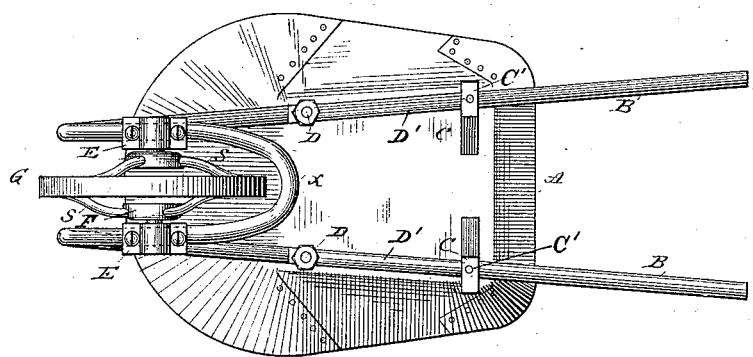
Figure 3:
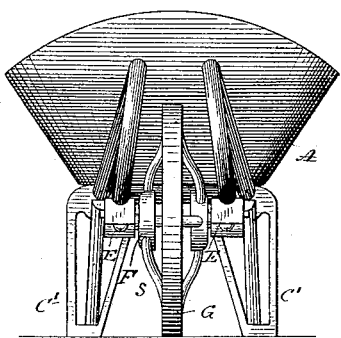
Figure 4:
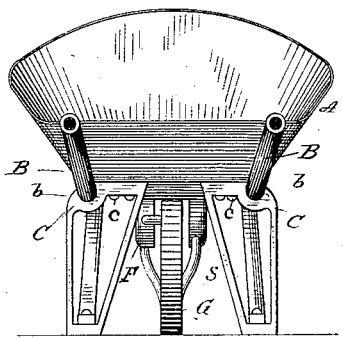

Referring to the accompanying drawings, which form a part of this specification, Figure 1 represents a side elevation. Fig. 2 is a view of the under side. Fig. 3 is a rear view, and Fig. 4 is a front view.

A is an ordinary box or wheelbarrow-case. B is a continuous bar or strip, extending outward and from both sides in front to form handles, and rearward, as shown in Figs. 1 and 2, to support and brace the box or casing A, and to form bearings for the wheel. At the points $b$, (see Figs. 1 and 4,) the bar B is secured to the box or casing A by means of clips C. These clips embrace the bar, and by means of bolts or screws $c$, secure it tightly to the case. The clips C are also extended downward, and form legs or supports C' for the wheelbarrow. Between the points $b$ and $b'$ the bar extends along the bottom of the casing, and at the latter points is further secured to said casing by means of bolts or screws D. Brackets D' extend from D to the bottom of the supports C'. By this means the wheelbarrow acquires additional strength and rigidity. From $b'$ the bar B extends upwardly on each side of the wheel, and thereby forms a double brace for the back of the case. It is then turned downward and inward, embracing the wheel at the innermost point of its periphery, as shown at $x$ in Fig. 2. The double support and bracing for the back of the case is a very essential and important point, and the result obtained by the curved portion or yoke $x$ of the frame by securing an elasticity and spring movement between said frame and the case is valuable, inasmuch as it greatly aids in the ease of propelling the vehicle, and diminishes the loss by wear and tear in the wheelbarrow itself. At suitable points on the continuous frame are placed journal-boxes E, in which are set the journals or bearings F of the wheel G.

The wheel G is constructed, preferably, as follows: The periphery is formed of T-iron, either wrought or cast. The spokes S are first set by dovetailing or otherwise into the hub F, and then, being of wrought-iron, are bent into and set against the inner angles of the T-shaped periphery. They may then be suitably secured either by riveting or otherwise.

I do not claim the construction of the wheel in this application, but reserve the right to make it the subject of a subsequent application for Letters Patent.

I am aware that wheelbarrow-frames have been formed of a single piece of metal by bending it in such a manner that its extremities will serve as the handles, and its mid-length as a support for the back of the box, the wheel being journaled thereto near the forward end and the bottom of the box rested thereon; but such is not the equivalent of my invention.

Having thus described my invention, what I claim as new therein, and desire to secure by Letters Patent, is—

1. A wheelbarrow having a continuous metallic frame bent so as to form a double support for the back of the box or casing, as set forth.

2. A wheelbarrow having a continuous metallic frame, said frame forming a double support for the back of the case and bent rearwardly to embrace the wheel, as set forth.

3. In a wheelbarrow, the combination of the box or casing, the continuous frame, and the clip C and legs C', as shown and described.

4. The combination, with a box, of a frame formed of a single piece of metal bent to conform to the bottom and rear sides of said box, and also to embrace and afford bearings for the wheel, as described.

5. In a wheelbarrow, the combination, with a box and suitable handles, of a frame on which the bottom of the box rests formed of a single piece of metal bent upwardly to support the rear side of the said box, thence downwardly and rearwardly in such manner as to embrace and afford bearings for the wheel-journals, as explained.

6. In a wheelbarrow, the box and suitable handles, in combination with a frame supporting the box and bent horizontally near its mid-length so as to embrace the wheel, and a wheel journaled to said horizontal portion, as and for the purpose set forth.

ABRAM M. DE GRAY.

Witnesses:
 HURBERT KNIGHT,
 CHARLES C. BUCKLEY.